US011796322B2

(12) United States Patent
Rolf et al.

(10) Patent No.: US 11,796,322 B2
(45) Date of Patent: Oct. 24, 2023

(54) APPARATUS, METHOD, AND COMPUTER PROGRAM PRODUCT FOR UPDATING LINK INFORMATION ON A CLIENT DEVICE

(71) Applicant: HERE GLOBAL B.V., Eindhoven (NL)

(72) Inventors: Daniel Rolf, Berlin (DE); Raul Cajias, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 579 days.

(21) Appl. No.: 16/664,358

(22) Filed: Oct. 25, 2019

(65) Prior Publication Data
US 2021/0123747 A1   Apr. 29, 2021

(51) Int. Cl.
*G01C 21/30*     (2006.01)
*G06F 16/23*     (2019.01)
(Continued)

(52) U.S. Cl.
CPC ............. *G01C 21/30* (2013.01); *G01C 21/34* (2013.01); *G01C 21/3446* (2013.01);
(Continued)

(58) Field of Classification Search
CPC ........ G01C 21/30; G01C 21/26; G01C 21/38; G01C 21/32; G06F 16/958; G06F 16/02; G06F 16/29; G16Y 40/60
(Continued)

(56) References Cited

U.S. PATENT DOCUMENTS 6,920,477 B2   7/2005  Mitzenmacher
8,682,578 B2   3/2014  Okude et al.
(Continued)

FOREIGN PATENT DOCUMENTS

WO   WO-2017196615 A2 * 11/2017 ......... G01C 21/3438

OTHER PUBLICATIONS

Blustein, James; El-Maazawi, Amal. Bloom Filters—A Tutorial, Analysis, and Survey, Dalhousie University Faculty of Computer Science, 2002. Technical Report CS-2002-10. https://cdn.dal.ca/content/dam/dalhousie/pdf/faculty/computerscience/technical-reports/CS-2002-10.pdf, PDF file. (Year: 2002).*

(Continued)

*Primary Examiner* — Yonel Beaulieu
*Assistant Examiner* — Aaron K McCullers
(74) *Attorney, Agent, or Firm* — DITTHAVONG, STEINER & MLOTKOWSKI

(57) ABSTRACT

An apparatus, a method and a computer program product are provided for updating link information on a client device. The method may include determining at least one map area comprising one or more links, the map area having at least one map area identifier, Sending to a data service, a request for at least one categorized link. Receiving, from the data service, at least one bloom filter, the at least one bloom filter encoding the at least one categorized link, determining one or more link identifiers for the one or more links in the map area and associating candidate link of the one or more links to the at least one categorized link, based on the link identifier of the at least one candidate link satisfying the at least one received bloom filter, to update the link information on the client device.

20 Claims, 6 Drawing Sheets

(51) Int. Cl.
*G01C 21/34* (2006.01)
*G06F 16/958* (2019.01)
*G06F 16/29* (2019.01)
*G01C 21/00* (2006.01)

(52) U.S. Cl.
CPC ......... *G01C 21/3453* (2013.01); *G01C 21/38* (2020.08); *G01C 21/3804* (2020.08); *G01C 21/3815* (2020.08); *G06F 16/2379* (2019.01); *G06F 16/29* (2019.01); *G06F 16/958* (2019.01); *G01C 21/3461* (2013.01); *G01C 21/3492* (2013.01); *G01C 21/3819* (2020.08); *G01C 21/3822* (2020.08); *G01C 21/3885* (2020.08)

(58) Field of Classification Search
USPC ....... 701/409, 410, 425, 430, 435, 450, 451, 701/453, 461, 535
See application file for complete search history.

(56) References Cited

U.S. PATENT DOCUMENTS

| | | | | |
|---|---|---|---|---|
| 11,644,333 | B2* | 5/2023 | Rolf | G01C 21/367 |
| | | | | 701/454 |
| 2007/0073471 | A1 | 3/2007 | Abe | |
| 2009/0156229 | A1* | 6/2009 | Hein | G01C 21/20 |
| | | | | 455/456.1 |
| 2014/0280342 | A1* | 9/2014 | Litherland | G06F 21/602 |
| | | | | 707/780 |
| 2014/0358414 | A1* | 12/2014 | Ibrahim | G08G 1/0141 |
| | | | | 701/119 |
| 2015/0168147 | A1* | 6/2015 | Duleba | G01C 21/3484 |
| | | | | 701/538 |
| 2016/0187146 | A1* | 6/2016 | He | G01C 21/30 |
| | | | | 701/532 |
| 2016/0357262 | A1* | 12/2016 | Ansari | G08G 1/166 |
| 2016/0370193 | A1 | 12/2016 | Maischberger et al. | |
| 2017/0016730 | A1* | 1/2017 | Gawrilow | G01C 21/30 |
| 2017/0314935 | A1* | 11/2017 | Vakharia | G01C 21/32 |
| 2017/0322036 | A1* | 11/2017 | Gonopolskiy | G01C 21/3859 |
| 2019/0011276 | A1 | 1/2019 | Tava | |
| 2019/0313224 | A1* | 10/2019 | Yu | H04L 67/12 |

OTHER PUBLICATIONS

Pan, "Vehicle Re-routing Strategies for Congestion Avoidance", retrieved from https://pdfs.semanticscholar.org/8733/e3fc28f07fe2288a4a139504ec476ef1b66b.pdf, Jan. 2014, 138 pages.

Ni et al., "Privacy-preserving Smart Parking Navigation Supporting Efficient Driving Guidance Retrieval", Feb. 20, 2018, 14 pages.

Jiang et al., "Design of a Multiple Bloom-filter for Distributed Navigation Routing", in IEEE Transactions on Systems, Man, and Cybernetics: Systems, vol. 44, No. 2, 8 pages.

* cited by examiner

APPARATUS, METHOD, AND COMPUTER PROGRAM PRODUCT FOR UPDATING LINK INFORMATION ON A CLIENT DEVICE

TECHNOLOGICAL FIELD

The present disclosure generally relates to routing and navigation systems, and more particularly relates to updating link information of a geographical region for time dependent and vehicle dependent restrictions.

BACKGROUND

Various navigation applications are available to provide assistance, for example directions for driving, walking, or other modes of travel. Web-based and mobile app-based systems offer navigation applications that allow a user to request directions from one point to another. Navigation devices based on Global Positioning System (GPS) technology have become common, and these systems are often used to provide directions to drivers, pedestrians, cyclists, and the like. The route request is generated by the user to receive navigation assistance. In response to this, a route may be generated between the current location and destination location of the user. Quite often, such routes may encompass many different types of links. Some links are traversable for some types of vehicle but not for other types of vehicles. Similarly, some types of links are traversable for some vehicles only for some particular time period of the day. In order to provide reliable navigation assistance, it is important to determine which link is traversable and which link is non-traversable for a vehicle.

In certain scenarios, the map data stored by the client device and the map data stored by the server may be different versions of a digital map. In such scenarios, the server may have to maintain multiple versions of the map. However, such solution of maintaining multiple versions of the map may not be viable for the server that updates the map regularly since the amount of memory needed to store and maintain all of the multiple versions of the map by the server are large. Further, such solution may also hinder performance and may pose various maintenance problems for the server. In certain other scenarios, such solution may obstruct rapid refreshing of the digital map in the server.

Accordingly, there is a need for the server and the client device to have a map version agnostic communication solution so that all links of a non-traversable links or traversable links may be referenced by a commonly understandable ID in a bandwidth efficient manner.

BRIEF SUMMARY OF SOME EXAMPLE EMBODIMENTS

Various embodiments provide for generating map data of categorized links in a map version agnostic manner. As used herein, map version agnostic information/data is map information/data that is independent of a particular version of the digital map. For example, map version agnostic information/data is map information/data that is not expected to change between a first version of the digital map and a second version of the digital map. As used herein, a digital map may be map content of the world in an attribute, image, and/or vector form. According to some example embodiments, a digital map may be the map content of the world in a gridded or tessellated (i.e. a two dimensional representation), and/or a cubed, pyramidic, etc. form (i.e. a three-dimensional representation). In various embodiments, the map content may include map features such as physical features on the ground (e.g., roads, buildings, and the like). Various embodiments provide for generating and transmitting the map data of categorized links in a bandwidth efficient manner. In various embodiments, map updates correspond to up-to-date categorized links of the geographic region. For example, the up-to-date categorized links may be the categorized links associated with most recent version of the digital map. Various embodiments provide for encoding categorized links using map version agnostic identifiers that are encoded into a bloom filter, such that the encoded categorized links may be transmitted as a bit array.

In an embodiment, the digital map may be partitioned in 2 dimensions (in a tiled, gridded, or tessellated form). According to some embodiments, each cell of the grid may indicate a map area or a map region. In an embodiment, a shape of the cell may be a polygon such as a square, a rectangular, a pentagon, or the like. The cell may cover a portion of a geographical region (e.g., an area) of the digital map. In an example embodiment, the map area may contain many links/route segments. In an example embodiment, the map area may be represented by one or multiple map tiles. According to some example embodiments, these links may be traversable links or non-traversable links. In various embodiments, the non-traversable links may be the categorized links. According to some example embodiments, a link may be a non-traversable link based on a type of a vehicle (a cargo type of the vehicle), time of travel of the vehicle, year of manufacture of the vehicle or emission rating of the vehicle. For example, heavy-weight vehicles may not be allowed to travel on city roads during rush hours of a day. According to some embodiments, the non-traversable links may be blacklisted road segments/links. In some embodiments, the traversable links may be the categorized links.

Generating the map data of the categorized links in a geographical region may comprise: (i) transmission of categorized links request for at least one map area, from a client (also referred to as client device) to a data service; (ii) generation of encoded categorized links for the at least one map area in the data service and transmission of the encoded categorized links in a bandwidth efficient manner from the data service to the client; and (iii) decoding the received encoded categorized links in a map version agnostic manner.

In various embodiments, the client may have a client version of the digital map stored in memory of the client. For example, the client version of the map may be obtained from a mapping platform and stored in memory of the client. The client may transmit a request for categorized links in the map area. As used herein, the map area may be referred by a map area identifier (ID) (also referred as map ID). A map area identifier (ID) may be version independent, i.e. the map area identifier may refer to the same geographical site throughout map versions. In some embodiments, where a map area may be a map tile, the map tile may be referred by a map tile ID. As described, the map area comprises traversable links and non-traversable links (i.e., categorized links). According to some example, the request for categorized links corresponds to up-to-date non-traversable links, in accordance with time and vehicle dependencies. In few embodiments, the request for categorized links corresponds to up-to-date traversable links, in accordance with time and vehicle dependencies.

In various embodiments, the data service may have a data service version of the digital map stored in memory of the data service. For example, the data service may have ready access to most recently updated version of the digital map (i.e., the data service of the digital map). In various situations, the client version and the data service version may be different versions of the digital map.

The data service may receive the categorized links request for the map ID from the client. The data service may determine the categorized links, using the data service version of the digital map associated with the map ID.

The data service may obtain the categorized links in an area (i.e., the categorized links associated with the map ID). The data service may determine a link identifier for each of the categorized links. In an example embodiment, the data service may generate map version agnostic identifiers to determine the link identifiers. In various embodiments, the map version agnostic identifier for a link may be a particular element and/or particular combination of attributes of map version agnostic information corresponding to the link. According to some example embodiments, the map version agnostic information may include a name of the road segment/link, a length of the road segment, a travel direction of the road segment, a functional class of the road segment, speed limit of the road segment, midpoint of the road segment, and/or the like. The data service may code each of the map version agnostic identifiers using one or more coding functions. According to some example embodiments, the coded map version agnostic identifiers are the link identifiers.

Furthermore, the data service may generate a link identifier set (S). In an embodiment, the set S may be defined by the link identifiers of the categorized links. The link identifier set may comprise one or more link identifiers that identify the links in the data service version of the map. Each element of the set S (e.g., the link identifier) may be encoded into a bloom filter (e.g., a bit array of 'm' bits). The encoded bloom filter may then be used to test one or more link identifiers, to determine if it is possible that the one or more link identifiers may be elements of the set S. For example, the encoded bloom filter may be used to test whether one or more links are categorized links of the route.

Furthermore, the data service may generate an identifier test set (T) for the encoded bloom filter. In an embodiment, the identifier test set (T) may comprise non-categorized links identifiers. For example, if categorized links are non-traversable links, then the non-categorized links are traversable links and vice-versa. In various embodiments, the non-categorized link identifiers are generated as described for the link identifiers. For example, the non-categorized link identifiers are coded map version agnostic identifiers of the non-categorized links.

Furthermore, the data service may test the encoded bloom filter using the identifier test set (T) to determine whether the encoded bloom filter provides any false positive. According to some embodiments, the encoded bloom filter is tested to determine whether members of the identifier test set (T) satisfy the encoded bloom filter. For example, the encoded bloom filter is tested to determine whether any of the non-categorized links are members of the categorized links encoded in the bloom filter.

If any member of the identifier test set (T) satisfies the encoded bloom filter, then the data service may reject the encoded bloom filter and initialize a new bloom filter (e.g., a bit array of 'm+1' bits). The data service may further encode the link identifiers of the link identifier set (S) into the new bloom filter. As described above, the data service may test the new bloom filter to determine whether any member of the identifier test set (T) satisfies the new bloom filter. The data service may continue the foresaid testing process until none of the members of the identifier test set (T) satisfy the bloom filter. For example, the data service generates a false-positive-free bloom filter.

The data service may provide the false-positive-free bloom filter to the client as the map data of categorized links. In various embodiments, the client may use the false-positive-free bloom filter and the client version of the digital map to decode the categorized links associated with the map tile ID. For example, the false-positive-free bloom filter may indicate an encoded version of link identifiers corresponding to each link of the categorized link. The client may update the client side link information, using the categorized links, to determine the route.

The client or an application executed by the client may access the updated link information to perform one or more navigation functions. Some non-limiting examples of the navigation functions include providing a route (e.g. via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. Thus, the categorized links of the map area (i.e., map tile ID) may be determined using the data service version of the map and then decoded using the client version of the map such that differences between the data service version and the client version of the map may be tolerated. Additionally, the bandwidth used to provide the categorized links are minimized by encoding the categorized links using a small bloom filter that does not provide any false positives for any of the non-categorized links of the geographical region.

An apparatus, a method, and a computer program product are provided herein that focus on updating link information on a client device.

In one aspect, the method for updating link information on a client device is provided. The method may include determining at least one map area comprising one or more links, said map area having at least one map area identifier, and sending, to a data service, a request for at least one categorized link, said request identifying the at least one map area. The method may further include receiving, from the data service, at least one bloom filter, said at least one bloom filter encoding the at least one categorized link, determining one or more link identifiers for the one or more links in the at least one map area and associating, at least one candidate link of the one or more links to the at least one categorized link, based on the link identifier of the at least one candidate link satisfying the at least one received bloom filter, to update the link information on the client device.

According to some example embodiments, the method may include providing the at least one candidate link to a navigation application.

According to some example embodiments, the method may include determining a geographical region encompassing at least a portion of a route, determining for the geographical region, the at least one map area covering the at least one portion of the route, and including the at least one map area identifier of the at least one map area in the request for at least one categorized link.

According to some example embodiments, the method may include recalculating the route, based on the route encompassing the at least one candidate link.

According to some example embodiments, the request for categorized links comprises at least one of dimensions of a vehicle, emissions rating of the vehicle, cargo type of the vehicle, cargo capacity of the vehicle, time of travel of the vehicle, engine type of the vehicle, or year of manufacture of the vehicle.

According to some example embodiments, the method may further include determining expected validity timeframe for the at least one categorized link of the at least one map area and including the expected validity timeframe in the request.

According to some example embodiments, the method may further include accessing map version agnostic information regarding each of the one or more links, generating a map version agnostic identifier for each of the one or more links, coding the map version agnostic identifier for each of the one or more links using at least one coding function, and providing, the coded map version agnostic identifier for each link of the one or more links, as the one or more link identifiers.

According to some example embodiments, the at least one categorized link corresponds to non-traversable route segments for a vehicle.

According to some example embodiments, the at least one categorized link corresponds to traversable route segments for a vehicle.

In yet another aspect, an apparatus for updating link information on a client device is provided. The apparatus comprises at least one non-transitory memory configured to store computer program code instructions and at least one processor configured to execute the computer program code instructions to: determine at least one map area comprising one or more links, said map area having at least one map area identifier, send, to a data service, a request for at least one categorized link, said request identifying the at least one map area, receive, from the data service, at least one bloom filter, said at least one bloom filter encoding the at least one categorized link, determine one or more link identifiers for the one or more links in the at least one map area, and associate, at least one candidate link of the one or more links to at least one categorized link, based on the link identifier of the at least one candidate link satisfying the at least one received bloom filter, to update the link information on the client device.

According to some example embodiments, the at least one processor may be further configured to provide the at least one candidate link to a navigation application.

According to some example embodiments, the at least one processor may be further configured to determine a geographical region encompassing at least a portion of a route, determine for the geographical region, the at least one map area covering the at least one portion of the route, and include the at least one map area identifier of the at least one map area in the request for at least one categorized link.

According to some example embodiments, the at least one processor may be further configured to recalculate the route, based on the route encompassing the at least one candidate link.

According to some example embodiments, the request for categorized links comprises at least one of dimensions of a vehicle, emissions rating of the vehicle, cargo type of the vehicle, cargo capacity of the vehicle, time of travel of the vehicle, engine type of the vehicle, or year of manufacture of the vehicle.

According to some example embodiments, the at least one processor may be further configured to determine expected validity timeframe for the at least one categorized link of the at least one map area and include the expected validity timeframe in the request.

According to some example embodiments, the at least one processor may be further configured to access map version agnostic information regarding each of the one or more links, generate a map version agnostic identifier for each of the one or more links, code the map version agnostic identifier for each of the one or more links using at least one coding function, and provide, the coded map version agnostic identifier for each link of the one or more links, as the one or more link identifiers.

According to some example embodiments, the at least one categorized link corresponds to non-traversable route segments for a vehicle.

According to some example embodiments, the at least one categorized link corresponds to traversable route segments for a vehicle.

In yet another aspect, a computer program product for updating link information on a client device is provided. The computer program product comprises a non-transitory computer readable medium having stored thereon computer executable instructions, which when executed by one or more processors, cause the one or more processors to carry out operations for updating link information on a client device. The operations comprise determining at least one map area comprising one or more links, said map area having at least one map area identifier. The operations further comprises sending, to a data service, a request for at least one categorized link, said request identifying the at least one map area, receiving, from the data service, at least one bloom filter, said at least one bloom filter encoding the at least one categorized link, and determining one or more link identifiers for the one or more links in the at least one map area. The operations further comprise associating, at least one candidate link of the one or more links to the at least one categorized link, based on the link identifier of the at least one candidate link satisfying the at least one received bloom filter, to update the link information on the client device.

In various example embodiments, the operations further comprise providing the at least one candidate link to a navigation application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
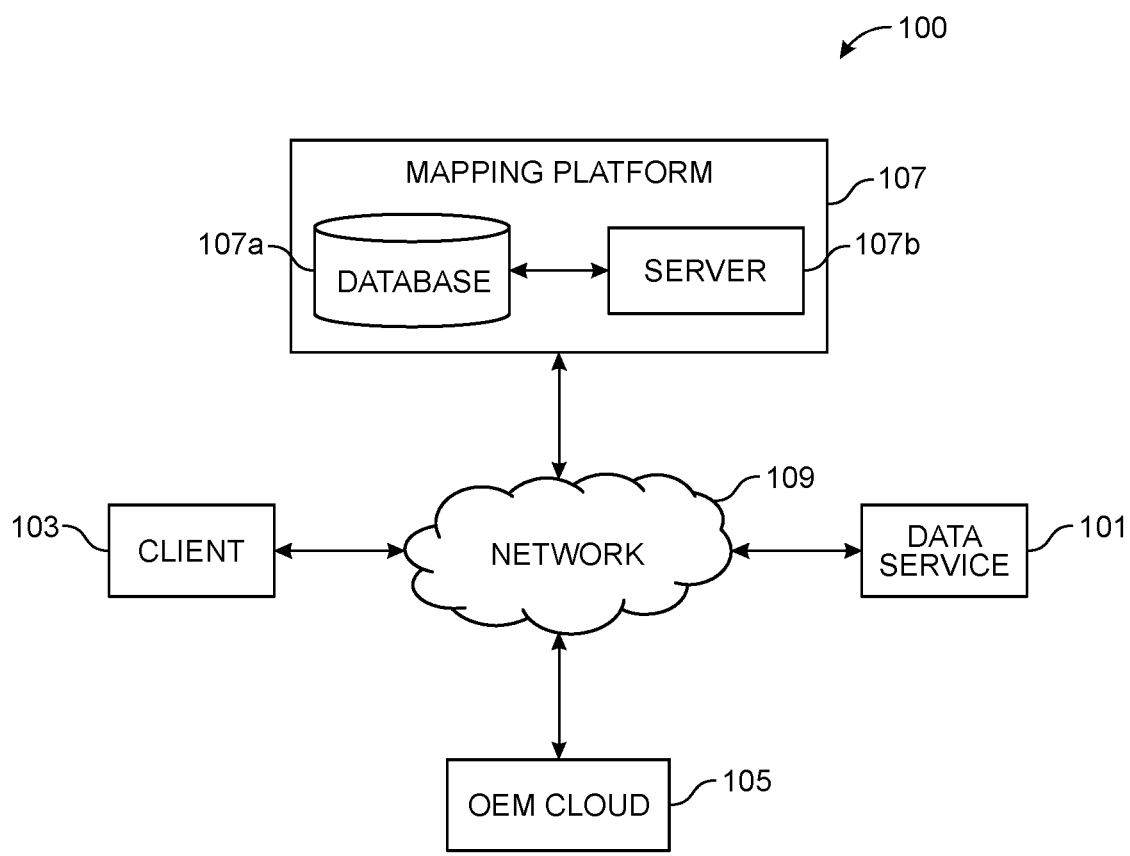
Figure 2A:
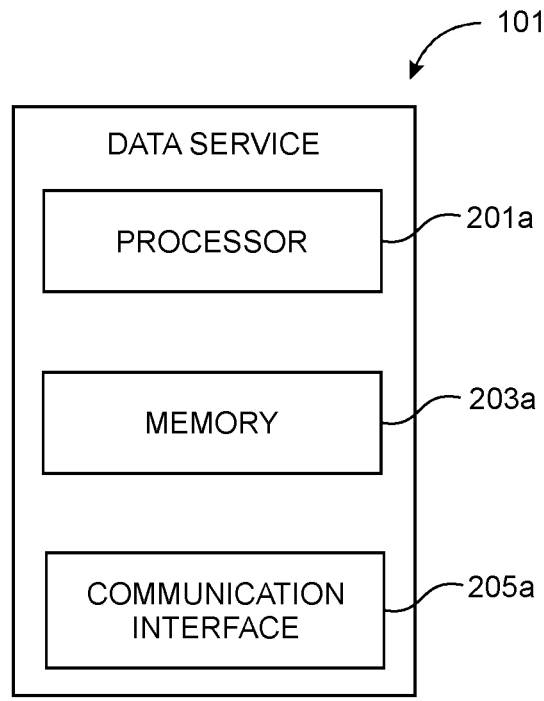
Figure 2B:
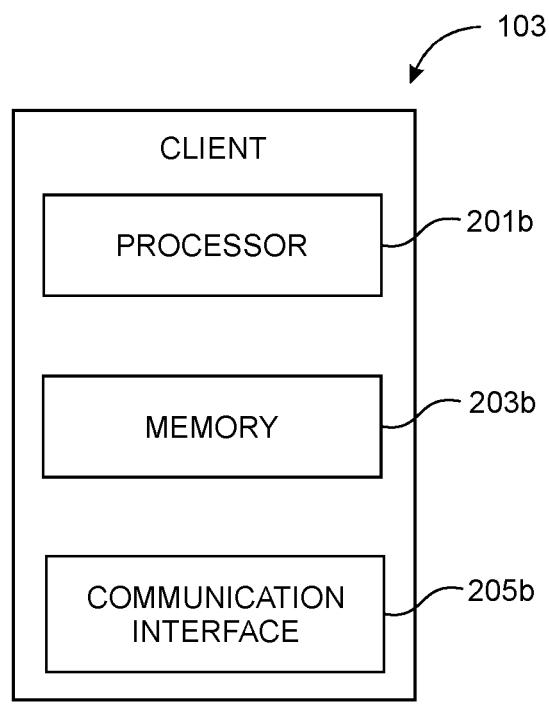
Figure 3:
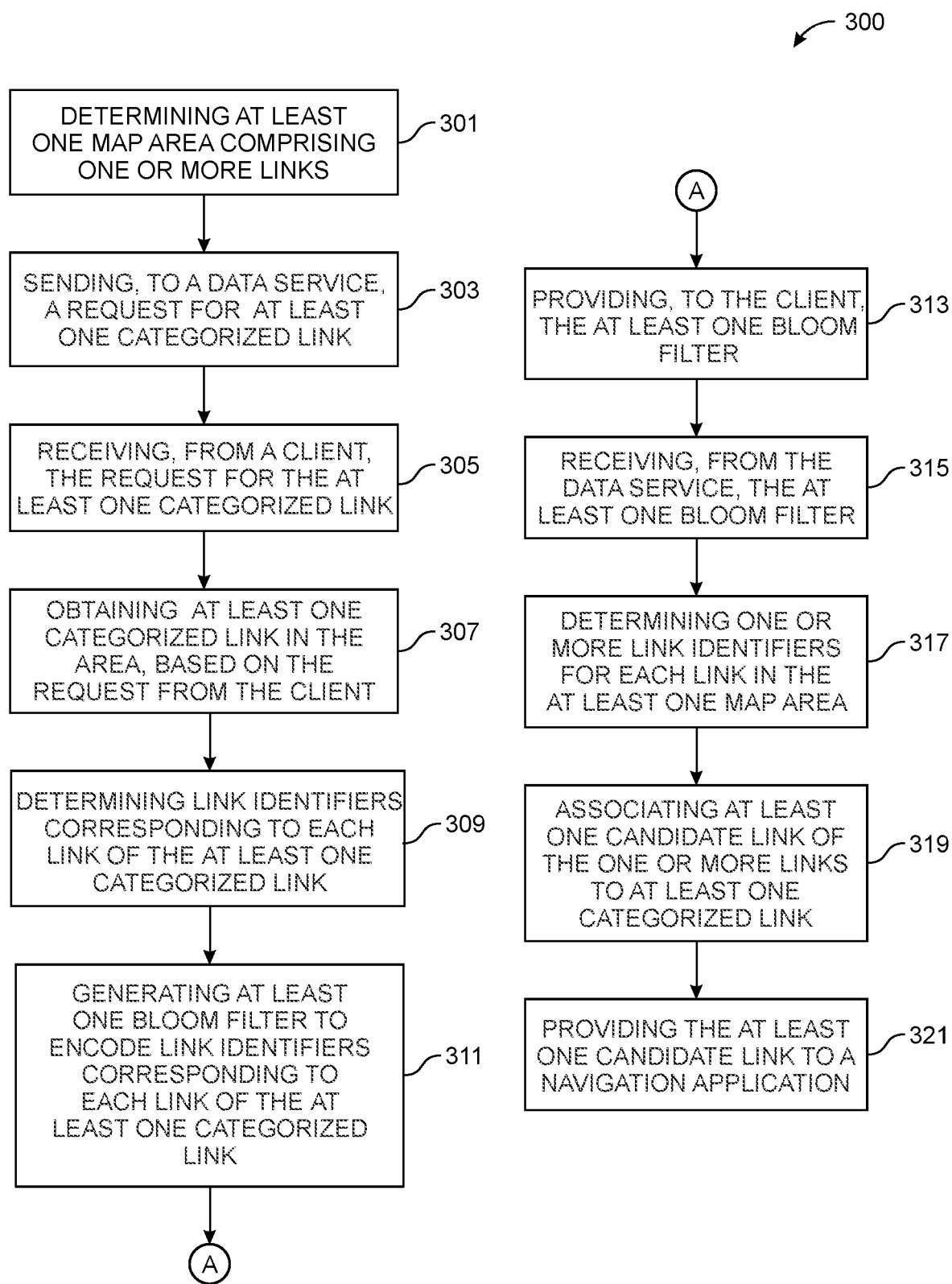
Figure 4:
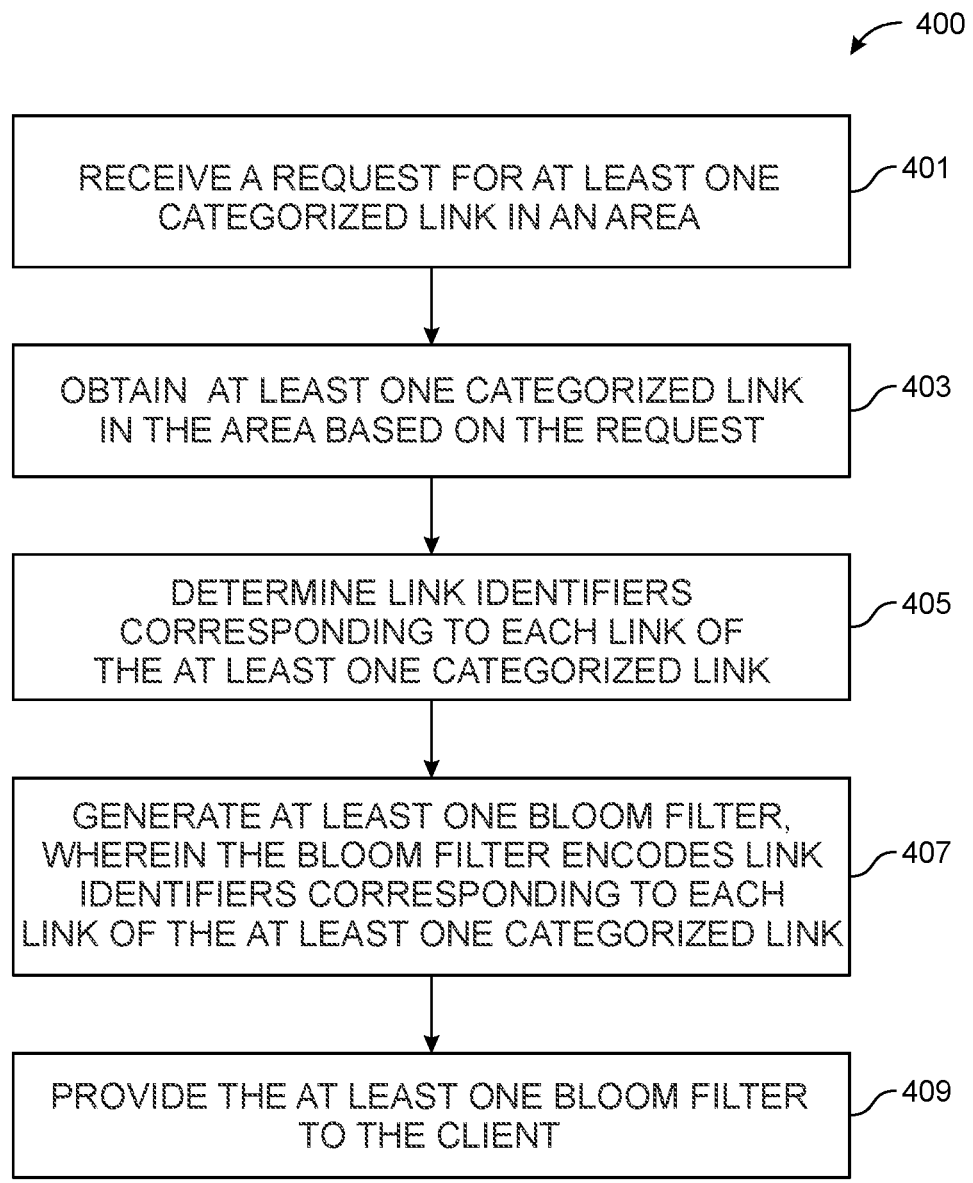
Figure 5:
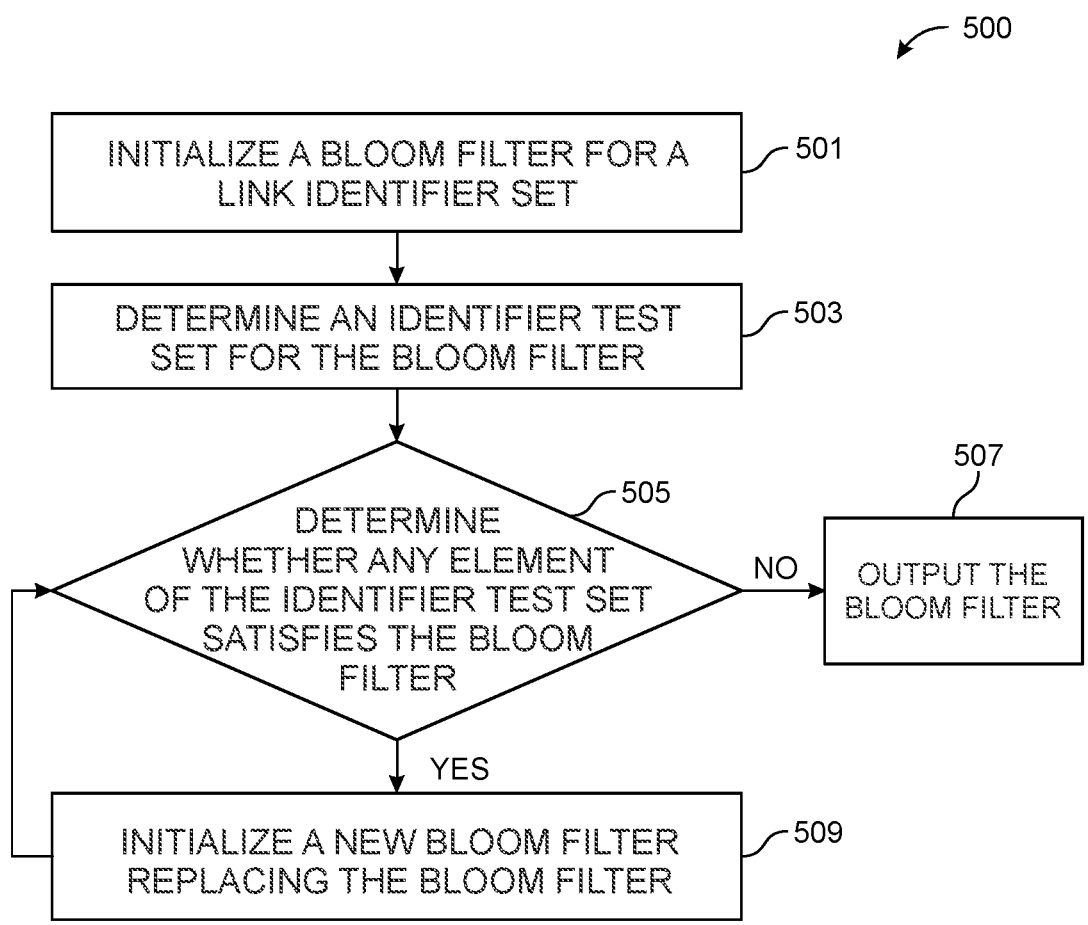
Figure 6:
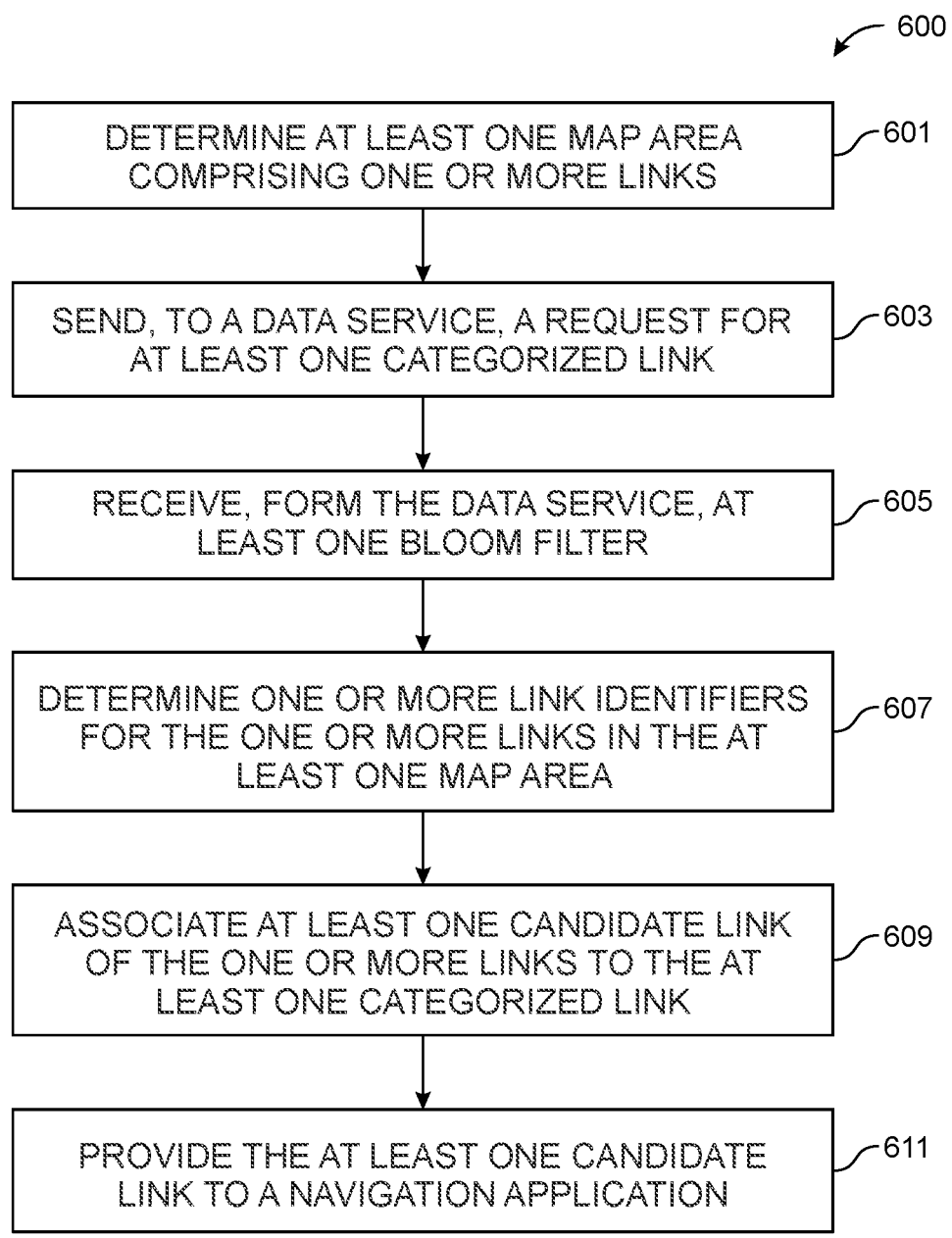

Having thus described example embodiments of the disclosure in general terms, reference will now be made to the accompanying drawings, which are not necessarily drawn to scale, and wherein:

FIG. 1 illustrates a block diagram showing an example architecture of one or more example embodiments;

FIG. 2A illustrates a block diagram of a data service for generating map data of categorized links, in accordance with one or more example embodiments;

FIG. 2B illustrates a block diagram of a client for updating link information, in accordance with one or more example embodiments;

FIG. 3 illustrates a flow chart representing general overview of steps performed by the client and the data service for executing a link information update protocol, in accordance with an example embodiment;

FIG. 4 illustrates a flow chart of operations performed by the data service of FIG. 2A for generating map data of categorized links, in accordance with an example embodiment;

FIG. 5 illustrates a flow chart of operations performed by the data service of FIG. 2A for generating at least one bloom filter, in accordance with an example embodiment;

FIG. 6 illustrates a flow chart of operations performed by the client of FIG. 2B for updating link information, in accordance with an example embodiment; and

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may refer to any connecting pathway including but not limited to a roadway, a highway, a freeway, an expressway, a lane, a street path, a road, an alley, a controlled access roadway, a free access roadway, and the like.

The term "non-traversable route" may refer to a path from a source location to a destination location on any link that is prohibited for traversal due to one or more of regulatory, traffic, or vehicular restrictions. The non-traversable on the path may, for example, be due to time based and/or vehicle based restrictions. In some example embodiments, the terms "blacklisted links" and/or "categorized links" may refer to or be a part of the "non-traversal route"

The term 'autonomous vehicle' may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

The term "map agnostic information" is map information or data that is independent of a particular version of a digital map. For example, map agnostic information may be map information that is not expected to change between a first version of the digital map and a second version of the digital map. The map version agnostic map information may include, but not limited to, a road name, segment length, a direction of travel of a segment, a functional class of a segment, speed limit, and segment midpoint.

The term "bloom filter" may refer to a space-efficient probabilistic data structure that is used to test whether an element is a member of a set. False positive matches are possible, but false negatives are not. In other words, a query of a bloom filter returns either "possibly in set" or "definitely not in set." An empty bloom filter is a bit array of m bits, all set to 0. One or more coding functions (e.g., k coding functions) are defined and used to map or code a set element to one of the m array positions. For example, to add a set element to the bloom filter, each of the k coding functions are used to identify k array positions. The k identified array positions are set to 1. To query the bloom filter to test whether a test element is in the set, the test element is coded using each of the k coding functions to determine k array positions corresponding to the test element. If any of the k array positions corresponding to the test element are 0, the test element is definitely not in the set. If all of the k array positions corresponding to the test element are in the set, then it is possible that the test element is a member of the set encoded by the bloom filter.

End of the Definitions

An apparatus, a method, and a computer program product are provided herein for generating map data of one or more categorized links in a map area. Accordingly, the categorized links of the map area (i.e., links corresponding to a map area, the map area identifiable by a map area ID) may be determined using the data service version of the map and then decoded using the client version of the map such that differences between the data service version and the client version of the map may be tolerated/compensated. Additionally, the bandwidth used to provide the categorized links are minimized by encoding the categorized links using a bloom filter bit array that does not provide any false positives for any of the non-categorized links of the map area, as a bloom filter is typically far smaller than an explicit link listing. These and other technical improvements of the invention will become evident from the description provided herein.

FIG. 1 illustrates a block diagram 100 showing an example architecture of one or more example embodiments of the present invention. As shown in FIG. 1, the block diagram 100 comprises a data service 101, a client 103, an Original Equipment Manufacturer (OEM) cloud 105, a mapping platform 107, and a network 109. In various embodiments, the data service 101 may be a backend server, a remotely located server, or the like. In some example embodiments, the data service 101 may be the server 107b of the mapping platform 107. In some embodiments, the client 103 may be a device onboard a vehicle. In various embodiments, the client 103 may be a vehicle navigation system, vehicle control system, a mobile computing device and/or the like. Both the data service 101 and the client 103 may have suitable computing capabilities to carry out various functionalities described herein. To this end the data service 101 and the client 103 may have at least a processing means, a storage means, and a communication interface means. In some example embodiments, one or both of the data service 101 and client device 103 may be embodied as a separate apparatus. A detailed description of the hardware configuration of the data service 101 and the client 103 are described in detail with reference to FIGS. 2A and 2B respectively.

The mapping platform 107 may comprise a database 107a for storing map data and a server 107b for processing inbound or outbound communications. The database 107a may store node data, road segment data, link data, link identification information, heading value records, point of interest (PoI) data, or the like. The database 107a may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107a may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107a may also store data about the POIs and their respective locations in the POI records. The database 107a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 107a may include event data (e.g., traffic incidents, construction activities, scheduled events, unscheduled events, accidents, diversions etc.) associated with the POI data records or other records of the database 107a. Optionally or additionally, the database 107a may store 3D building maps data (3D map model of objects) of structures surrounding roads and streets.

The database 107a may be maintained by a content provider e.g. a map developer. By way of example, the map developer may collect geographic data to generate and enhance the database 107a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

The database 107a may be a master database stored in a format that facilitates updating, maintenance, and development. For example, the master database or data in the master database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by client such as the client 103, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received database in a delivery format to produce one or more compiled navigation databases.

The server 107b may comprise processing means and communication means. For example, the processing means may comprise one or more processors configured to process requests received from the client 103 and/or the data service 101. The processing means may fetch map data from the database 107a and transmit the same to the client 103 and/or the data service 101 in a format suitable for use by the client 103 and/or the data service 101. In one or more example embodiments, when the data service 101 is integrated with the mapping platform 107, the mapping platform 107 may periodically communicate with the client 103 via the processing means to update a local cache of the map data stored on the client 103. Accordingly, in some example embodiments, the map data may also be stored on the client 103 and may be updated based on periodic communication with the mapping platform 107.

The mapping platform 107 may be communicatively coupled to the client 103 and/or the data service 101, via the network 109. In an embodiment, the mapping platform 107 may communicate with an Original Equipment Manufacturer (OEM) cloud 105 via the network 109, which in turn may be connected to the client 103. The client 103 may be any user accessible device such as a mobile phone, a smartphone, a portable computer, and the like that is portable in itself or as a part of another portable/mobile object such as a vehicle. In some example embodiments, the client 103 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In this context, the user may be an autonomous or semi-autonomous vehicle. The client may comprise processing means such as a central processing unit (CPU), storage means such as onboard read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the client 103. Additional, different, or fewer components may be provided. For example, the client 103 may be configured to execute and run mobile applications such as a messaging application, a browser application, a navigation application, and the like.

The network 109 may be wired, wireless, or any combination of wired and wireless communication networks, such as cellular, Wi-Fi, internet, local area networks, or the like. In one embodiment, the network 109 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

FIG. 2A illustrates a block diagram of the data service 101 for generating map data of categorized links, in accordance with one or more example embodiments. The data service 101 may include a processing means such as at least one processor 201a, storage means such as at least one memory 203a, and a communication means such as at least one communication interface 205a. The processor 201a may retrieve computer program code that may be stored in the memory 203a for execution of the computer program code.

FIG. 2B illustrates a block diagram of the client 103 for updating the link information, in accordance with one or more example embodiments. The client 103 may include a processing means such as at least one processor 201b, storage means such as at least one memory 203b, and a communication means such as at least one communication interface 205b. The processor 201b may retrieve computer program code instructions that may be stored in the memory 203b for execution of the computer program code instructions.

The processors 201a and 201b may be embodied in a number of different ways. For example, the processors 201a and 201b may be embodied as various hardware processing means such as coprocessors, microprocessors, controllers, digital signal processors (DSPs), processing elements with or without accompanying DSPs, or various other processing circuitries including integrated circuits such as, for example, ASICs (application specific integrated circuit), FPGAs (field programmable gate array), microcontroller units (MCU), hardware accelerators, special-purpose computer chips, or the like. As such, in some embodiments, the processors 201a and 201b may include processing cores configured to perform independently. A multi-core processor may enable multiprocessing within a single physical package. Additionally, or alternatively, the processors 201a and 201b may include one or more processors configured in tandem via the bus to enable independent execution of instructions, pipelining and/or multithreading.

Additionally, or alternatively, the processors 201a and 201b may include processors capable of processing large volumes of workloads and operations to provide support for big data analysis. In an example embodiment, the processors 201a and 201b may be in communication with memories 203a and 203b respectively via buses for passing information among components of structure 100. The memories 203a and 203b may be non-transitory and may include, for example, one or more volatile and/or non-volatile memories. In other words, for example, the memories 203a and 203b may be electronic storage devices (for example, a computer readable storage medium) comprising gates configured to store data (for example, bits) that may be retrievable by a machine (for example, a computing device like the processors (201a and/or 201b). The memories 203a and 203b may be configured to store information, data, content, applications, instructions, or the like, for enabling the apparatus to carry out various functions in accordance with an example embodiment of the present invention. For example, the memories 203a and 203b may be configured to buffer input data for processing by the processors 201a and 201b respectively. As exemplarily illustrated in FIG. 2A and FIG. 2B, the memories 203a and 203b may be configured to store instructions for execution by the processors 201a and 201b respectively. As such, whether configured by hardware or software methods, or by a combination thereof, the processors 201a and 2016 may represent entities (for example, physically embodied in circuitry) capable of performing operations according to an embodiment of the present invention while configured accordingly. Thus, for example, when the processors 201a and 201b are embodied as ASICs, FPGAs or the like, the processors 201a and 201b may be specifically configured hardware for conducting the operations described herein. Alternatively, as another example, when the processors 201a and 201b are embodied as an executor of software instructions, the instructions may specifically configure the processors 201a and 201b to perform the algorithms and/or operations described herein when the instructions are executed. However, in some cases, the processors 201a and 201b may be processor specific devices (for example, mobile terminal or fixed computing devices) configured to employ an embodiment of the present invention by further configuration of the processors 201a and 201b by instructions for performing the algorithms and/or operations described herein. The processors 201a and 201b may include, among other things, clocks, arithmetic logic units (ALU) and logic gates configured to support operation of the processors 201a and 201b.

In some embodiments, the processors 201a and 201b may be configured to provide Internet-of-Things (IoT) related capabilities to users of the data service 101 and the client 103 respectively, where the users may be a traveler, a rider, a pedestrian, and the like. In some embodiments, the users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The data service 101 and the client 103 may be accessed using the communication interfaces 205a and 205b respectively. The communication interfaces 205a and 205b may provide interfaces for accessing various features and data stored in the data service 101 and the client 103.

FIG. 3 illustrates a flowchart 300 representing a general overview of steps performed by the client 103 (hereinafter also referred to as client) and the data service 101 (hereinafter also referred to as data service) for executing the link information update protocol, in accordance with an example embodiment. Blocks 301, 303, 315, 317, 319, 321 of the flowchart 300 may be performed by the client 103 for updating the link information while blocks 305, 307, 309, 311, and 313 of the flowchart 300 may be performed by the data service 101 for generating the map data of categorized links.

At block 301, the method may comprise determining at least one map area comprising one or more links. The map area may be referred/identified by a map area identifier (i.e. map area ID). At block 303, the method may comprise sending, to a data service, a request for at least one categorized link. The request may identify the at least one map area.

At block 305, the method may comprise receiving, from a client, the request for the at least one categorized link. At block 307, the method may comprise obtaining at least one categorized link in the map area, based on the request from the client. At block 309, the method comprises determining link identifiers corresponding to each link of the at least one categorized link.

At block 311, the method may comprise generating at least one bloom filter, wherein the at least one bloom filter encodes link identifiers corresponding to each link of the at least one categorized link.

At block 313, the method may comprise providing, to the client, the at least one bloom filter. At block 315, the method may comprise receiving, from the data service, the at least one bloom filter. At block 317, the method may comprise determining one or more link identifiers for each link of the one or more links in the at least one map area.

At block 319, the method may comprise associating at least one candidate link of one or more links to the at least one categorized link, based on the link identifier of the at least one candidate link satisfying the at least one received bloom filter, to update the link information. At block 321, the method may comprise providing the at least one candidate link to a navigation application. The navigation application may be a map display, a routing engine or the like.

FIG. 4 illustrates a flow chart of operations performed by the data service 101 of FIG. 2A for generating map data of categorized links, in accordance with an example embodiment. Starting at block 401, the data service 101 may be configured to receive a request for at least one categorized link of a map area ID from the client 103. The request may specify for example, one or more restrictions associated with the client 103 and/or the links in a map area. Some non-limiting examples of the restrictions may include dimensions of a vehicle, emissions rating of the vehicle, cargo type of the vehicle, cargo capacity of the vehicle, speed of the vehicle, time of travel, engine type of the vehicle (e.g. electric, hybrid, gasoline, ethanol, diesel, natural gas, hydrogen, etc.), or year of manufacture of the vehicle. The restrictions may be one or more of vehicle related restrictions or link related restrictions. Vehicle related restrictions may refer to travel restrictions associated with a particular vehicle. For example, for a truck weighing 3.5 tons, prior to commencing a journey, it may be of particular importance to know the links that are permissible for traversal and/or non-permissible for traversal in a map area. Accordingly, for the truck, the request for categorized link(s) may include vehicle restrictions specific to the truck such as a weight of the truck, dimensions of the truck, engine type of the truck, carriage type of the truck, and the like. Link related restrictions may refer to restrictions specific to a particular link or road in the map area. For example, for a particular link only a specific type of vehicles may be permissible for travel or a specific type of vehicle for a specific time period may be permitted for travel. Accordingly, in such situations the request for candidate links may include the category types of link restrictions (which are associated with the road links themselves).

The data service 101 may determine a map area of the map ID in the data service version of digital map stored in the memory 203a. In various embodiments, the map area ID is independent of a version of the digital map. According to some embodiments, the request may further comprise a validity timeframe associated with the map area ID. In various embodiments, the validity timeframe may be an entry time and exit time of a vehicle into/out of a map area. For example, the validity timeframe may be an estimated/predicted entry and exit time for a map area of a vehicle while covering a route. In some example embodiments, the validity timeframe may contain date information. In some embodiments, the request may further include at least one dimension of the vehicle, cargo type of the vehicle, engine type of the vehicle, and/or the like.

At block 403, the data service 101 may be configured to obtain at least one categorized link in the map area (i.e., map area of the map ID) requested by the client. According to some embodiments, the data service 101 obtains at least one categorized link in the map area based on the validity timeframe of the map area. For example, the data service 101 may obtain at least one categorized link in the map area for a period of time (i.e., the time interval between the entry time and the exit time). In some embodiments, the data service 101 obtains at least one categorized link in the map area based on at least one dimension of the vehicle, cargo type of the vehicle, engine type of the vehicle, and/or the like. In some embodiments, the data service 101 obtains at least one categorized link in the map area based on the validity timeframe, the at least one dimension of the vehicle, and the cargo type of the vehicle. The categorized links may be category of links. In an embodiment, categorized links may be the links, which are non-traversable for the vehicle such as blacklisted links and the like. In an example embodiment, non-traversable or blacklisted links may be due to restrictions such as dimensions of the vehicle, cargo type of the vehicle, cargo capacity of the vehicle, speed of the vehicle, time of travel of the vehicle, engine type of the vehicle, fuel type of the vehicle, emissions rating of the vehicle, year of manufacture of the vehicle and/or the like. In an alternate embodiment, categorized links may be the links, which are traversable for the vehicle.

At block 405, the data service 101 may be configured to determine the link identifiers corresponding to each link of the at least one categorized link of the map area. The data service 101 may access map version agnostic information regarding each link of the at least one categorized link. For example, the data service 101 may store (e.g., in the memory 203a) a geographic database storing the map information of the data service version of the digital map. In an example embodiment, attributes of each link of the at least one categorized link to be accessed are pre-established and/or defined. In various embodiments, the map version agnostic map information/data attributes accessed may include a road name of the link, segment length, a direction of travel of the link, a functional class of the link, speed limit of the link, a midpoint of the link, and/or the like.

The data service 101 may generate a map version agnostic identifier for each link of the at least one categorized link using the map version agnostic information. For example, one or more map version agnostic attributes of the map information corresponding to each link of the at least one categorized link may be used to generate the map version agnostic identifier of each link of the at least one categorized link. In an example embodiment, the one or more map version agnostic attributes of the map information and an order in which map version agnostic attributes are combined to generate the map version agnostic identifier may be pre-established and/or defined. The data service 101 and the client 103 are both configured to generate map version agnostic identifiers in the same pre-established and/or defined way (e.g., using the same attributes of map information combined in the same order). For example, the map version agnostic identifier may be generated using a map version agnostic identifier algorithm. The data service 101 and the client 103 may use the same map version agnostic identifier algorithm. In an example embodiment, the map version agnostic identifier may be a text string generated by concatenating the functional class and the direction of travel to the road name. Further, the data service 101 may code each of the map version agnostic identifier using one or more coding functions. For example, the one or more coding functions may include a deterministic hashing function such as a secure hash algorithm (SHA), MD5 message-digest algorithm, and/or the like. The data service 101 may provide the coded map version agnostic identifiers as the link identifiers.

Furthermore, the data service 101 may be configured to generate at least one link identifier set (S) for the at least one categorized link. For example, the at least one identifier set may comprise link identifiers of the at least one categorized link. For example, if the categorized links is the non-traversable links, then the data service 101 generates the link identifier set comprising link identifiers of non-traversable links. According to some embodiments, the data service 101 may generate a link identifier set for each category of the at least one categorized link. For example, the data service 101 may generate a link identifier set for links having restriction on height of the vehicle.

At block 407, the data service 101 may be configured to generate at least one bloom filter, wherein the at least one bloom filter encodes link identifiers corresponding to each link of the at least one categorized link. For example, the data service 101 may generate at least one bloom filter for at least one link identifier set. Accordingly, one bloom filter of the at least one bloom filter corresponds to one link identifier set of the at least one link identifier set. As described above, if the categorized links are non-traversable links, the data service 101 generates a link identifier set of the link identifiers of the non-traversable links. The data service 101 generates a bloom filter for the link identifier set to encode all link identifiers of the link identifier set (i.e., non-traversable links for one or more type of restrictions). As described previously, the link identifiers are the coded map version identifiers. Accordingly, the link identifiers are encoded (i.e., added) in the bloom filter. In some embodiments, if a link identifier set corresponds to one category of the at least one categorized link, the data service 101 may generate a bloom filter for the link identifier set. For example, if the link identifier set corresponds to links having restriction on height of the vehicle, the data service 101 generates a bloom filter encoding the links having restriction on height of the vehicle.

According to some embodiments, the data service 101 may be configured to generate at least one identifier test set (T) for at least one bloom filter/one link identifier set (S). For example, if the link identifier set comprises link identifiers of non-traversable links, the data service generates an identifier test set comprising link identifier of traversable links. In various embodiments, the link identifiers for traversable links/non-traversable links are coded map version agnostic identifiers, which are determined as described in block 405. According to some embodiments, if the link identifier set corresponds to the links having restriction on height of the vehicle, the data service 101 generates an identifier test set comprising all links of the map area ID except the links having restriction on height of the vehicle.

The data service 101 may be configured to test the at least one bloom filter using at least one identifier test set. For example, the data service 101 may test each bloom filter of the at least one bloom filter using its corresponding identifier test set. For example, the data service 101 determines whether any member of the identifier test set satisfies the bloom filter. For example, if the bloom filter encodes link identifiers of non-traversable links and the identifier test set comprises link identifiers of the traversable links, the data service 101 tests whether any traversable link falls within the non-traversable links to avoid false positive.

If any link identifier of the identifier test set satisfies the bloom filter, then the bloom filter may be rejected, and a new bloom filter may be generated. For example, if the bloom filter is an 'm' bit array, then the new bloom filter of "m+1" bit array may be initialized. The data service 101 may further encode the link identifiers of the link identifier set corresponding to the bloom filter. According to some embodiments, the foresaid testing process may be stopped, when no match is determined for each of the at least one bloom filter.

At block 409, the data service 101 may be configured to transmit the at least one bloom filter as the map data of categorized links of the map area ID. For example, the data service 101 may transmit the encoded categorized links to the client 103. According to some embodiments, the map data of categorized links may further comprise a total count of links encoded in the at least one bloom filter. For example, if the categorized links are non-traversable links, then the total count of links will be a number of link identifiers of the non-traversable links that are encoded in the bloom filter.

FIG. 5 illustrates a flow chart 500 of operations performed by the data service 101 of FIG. 2A for generating at least one bloom filter, in accordance with an example embodiment. Starting at block 501, the data service 101 may be configured to initialize a bloom filter for a link identifier set. For example, the data service initializes the bloom filter with a size that is relatively small, such that the probability of false positives is arbitrarily high (i.e., a bit array of 'm' bits, where m is a positive integer). According to some embodiments, the bloom filter may encode link identifiers of the link identifier set. In various embodiments, the link identifier set comprises the link identifiers of categorized links.

At block 503, the data service 101 may determine an identifier test set for the bloom filter. According to some embodiments, the identifier test set may comprise one or more link identifiers of non-categorized links. For example, if the link identifier set comprises link identifiers of the non-traversable links, then the corresponding identifier test set may comprise link identifiers of the traversable links.

At block 505, the data service 101 may be configured to determine whether any link identifier of the identifier test set satisfies the bloom filter. The data service 101 may query the bloom filter to determine if a link identifier of the identifier test set is encoded in the bloom filter or not. The data service 101 may query all link identifiers of the identifier test. When it is determined that none of the elements (i.e., link identifier) of the identifier test set satisfies the bloom filter, the process may continue with block 507. At block 507, the data service 101 may be configured to output the bloom filter to generate map data of categorized links.

When it is determined that at least one element (i.e., link identifier) of the identifier test set satisfies the bloom filter, the processor may continue with block 509. At block 509, the data service 101 may be configured to initialize a new bloom filter replacing the bloom filter. For example, if the bloom filter, at block 501, is of size m (e.g., be a bit array of m bits), the data service 101 may initialize the new bloom filter of size m+1 (e.g., a bit array of m+1 bits). Further, the data service 101 may be configured to encode (i.e., add) the newly initialized bloom filter with all link identifiers of the link identifier set (as described in 501).

As should be understood, once the new bloom filter of size m+n is generated, the processor may return to block 505 to determine whether any element of the identifier test set satisfies the new bloom filter. For example, the data service 101 may determine whether any link identifier of the identifier test set is a member of the link identifier set. Responsive to determining that the new bloom filter does not indicate that any of the link identifier of the identifier test set is a member of the link identifier set, the data service 101 may continue with block 507. Responsive to determining that the new bloom filter does indicate that at least one of the link identifier of the identifier test set is a member of the road segment identifier set, the data service may continue with block 509 and a new larger bloom filter may be initialized for replacing the new bloom filter. For example, a new larger bloom filter of size (m+1)+1 is initialized. The process continues until the bloom filter for the link identifier set indicates that none of the link identifier of the identifier test set as the member of the link identifier set and the bloom filter is outputted at block 507.

FIG. 6 illustrates a flow chart 600 of operations performed by the client of FIG. 2B for updating link information, in accordance with an example embodiment. Starting at block 601, the client 103 may be configured to determine at least one map area comprising one or more links. According to some example embodiments, the client version of the digital map (i.e., map) may be partitioned within 2 dimensions (e.g., in a gridded, tiled, or tessellated format). In various embodiments, the number of cells of the grid may determine a level (e.g., first level of partition, second level of partition and so on) of the client version of the digital map. For example, the client version digital map may be divided into 4 geographical regions in level-1 (e.g. first level of partition), 16 geographical regions in level-2 (e.g. second level of partition), and so on. As used herein, the geographical region may be the map area. Accordingly, the map area may cover an area of the client version of the digital map. Each of the map areas (e.g., a cell of the grid) may be referred by map area identifiers (also referred to as map area ID). In an alternate embodiment, the map area may indicate a current area visible on the screen of the navigation application and the like (i.e., client 103). In some embodiments, a map area may be represented by one or more map tiles, wherein each map tile is identifiable by a map tile ID. According to some example embodiments, the map area comprises one or more links.

In an embodiment, the client 103 (e.g., the navigation application) may be triggered when it obtains start point and destination point from a user of the client 103. The client 103 may determine a potential route between the start point and the end point. For example, the client 103 may use Dijkstra's algorithm, shortest path algorithm, minimum spanning tree algorithm or the like for determining the potential route. In various embodiments, the potential route may be a fastest route to reach the destination point, a short distance route between the start point and the destination point, and/or the like. The client 103 may determine a map area encompassing the potential route. In some embodiments, for example, the client 103 may choose a level (e.g., any arbitrary partition of client version of the digital map) to determine the map area encompassing the potential route, such that the level contains sufficient amount of map information/data of the potential route. In some embodiments, the client may identify map areas (and their corresponding map area IDs) as a map area that encompasses the potential route. As used herein, level may correspond to the granularity level of map content in an area. The map data of an area or region may be stored at various levels of granularities. Accordingly, the client 103 may determine at least one map area ID that covers the geographic region encompassing the potential route. For example, the client 103 may use the potential route and the level of the client version of the digital map to determine the at least one map ID that covers the map area encompassing the potential route.

At block 603, the client 103 may be configured to transmit, to the data service 103, the request indicating the at least one map area (i.e., map area ID). In some embodiments, the request comprises at least one link category. The request may specify for example, one or more restrictions associated with the client 103 and/or the links in a map area. Some non-limiting examples of the restrictions may include dimensions of a vehicle, emissions rating of the vehicle, cargo type of the vehicle, cargo capacity of the vehicle, speed of the vehicle, time of travel, engine type of the vehicle, or year of manufacture of the vehicle. The restrictions may be one or more of vehicle related restrictions or link related restrictions. Vehicle related restrictions may refer to travel restrictions associated with a particular vehicle. For example, for a truck weighing 3.5 tons, prior to commencing a journey, it may be of particular importance to know the roads that are permissible for traversal and/or non-permissible for traversal in a geographic region. Accordingly, for the truck, the request for categorized link(s) may include vehicle restrictions specific to the truck such as a weight of the truck, dimensions of the truck, engine type of the truck, carriage type of the truck, and the like. Link related restrictions may refer to restrictions specific to a particular link or road in the map area. For example, for a particular road only a specific type of vehicles may be permissible for travel or a specific type of vehicle for a specific time period may be permitted for travel. Accordingly, in such situations the request for candidate links may include the category types of link restrictions (which are associated with the road links themselves).

For example, in case of the at least one dimension of the vehicle, the client 103 may request the restricted links for a vehicle of weight 10 tons or the client 103 may transmit only the dimensions of the vehicle to receive the restricted links for the dimensions of the vehicle. According to some example embodiments, if the request comprises more than one map area ID, the client 103 may request the at least one categorized link in form of a bounding box, map area range and/or the like. In various embodiments, the bounding box/map area range may be a set comprising one or more map area IDs. According to some embodiments, the request may further comprise a validity time frame of the at least one map area. In various embodiments, the client 103 may determine a validity time frame (entry time and exit time) of the map area while determining the potential route (for example using the spanning tree algorithm or the like).

At block 605, the client 103 may be configured to receive, from the data service 103, at least one bloom filter (i.e., the map data of categorized links). According to some embodiments, the at least one bloom filter corresponds to the at least one categorized link. For example, if the categorized links are non-traversable links, the client 103 receives the bloom filter corresponding to the non-traversable links. For example, the client 103 receives the bloom filter that encodes the link identifiers of the non-traversable links. In some embodiments, the client 103 may receive a bloom filter for each category of the at least one categorized link. For example, the client 103 may receive a bloom filter encoding the link identifiers of the links having restriction on height of the vehicle. According to some embodiments, the map data of categorized links may further comprise the total count of links encoded in the at least one bloom filter.

At block 607, the client 103 may be configured to determine the link identifier for each of the one or more links in the at least one map area. In various embodiments, the client 103 may generate map version agnostic identifiers to determine the link identifiers. For example, the client 103 may obtain the map version agnostic information of the map ID to generate the map version agnostic identifier for each of the one or more links of the map ID. For example, the client 103 may store geographic database storing the map version agnostic information of the client version of the map. A link record corresponding to a link may be obtained and map version agnostic information may be extracted therefrom. In an example embodiment, attributes of the links to be obtained are pre-established and/or defined. For example, the map version agnostic information obtained may include a road name of the link, a length of the link, a direction of travel of the link, a functional class of the link, speed limit of the link, midpoint of the link, and/or the like.

The map version agnostic identifiers may be generated using the map version agnostic information. For example, one or more map version agnostic attributes of the map information corresponding to a link may be used to generate a map version agnostic identifier for the link. In an example embodiment, the one or more map version agnostic attributes of the map information and an order in which map version agnostic attributes are combined to generate the map version agnostic identifier is pre-established and/or defined. The data service 101 and the client 103 are both configured to generate map version agnostic identifiers in the same pre-established and/or defined way (e.g., using the same attributes of map information combined in the same order). For example, the map version agnostic identifier may be generated using a map version agnostic identifier algorithm and the data service 101 and the client 103 may use the same map version agnostic identifier algorithm. In an example embodiment, the map version agnostic identifier may be a text string generated by concatenating the functional class and the travel direction to the road name. Further, the client 103 may code each of the map version agnostic identifier using one or more coding functions. In an example embodiment, the one or more coding functions include one or more hashing functions. For example, the one or more coding functions may include a deterministic hashing function such as a secure hash algorithm (SHA), MD5 message-digest algorithm, and/or the like. The client 103 may provide the coded map version agnostic identifiers as the link identifiers.

At block 609, the client 103 may be configured to associate at least one candidate link of the one or more links to the at least one categorized link, based on the link identifier of the at least one candidate link satisfying the at least one received bloom filter, to update the link information of the at least one map area. According to some embodiments, the client 103 may check for a match for each link identifier of the one or more links in the at least one bloom filter. As described previously, the link identifier may be the coded map version agnostic identifier. The client may query the bloom filter to determine if the link identifier is present in the bloom filter. In response to determining, that at least one link identifier (i.e., a candidate link) of one or more links satisfying a candidate bloom filter of the at least one bloom filter, the client 103 may associate the at least one category, to the candidate link, corresponding to the candidate bloom filter. For example, if the candidate link satisfies the received bloom filter that encodes the link identifiers of the links having restriction on height of the vehicle, associating the candidate link to the links having restriction on height of the vehicle. According to some embodiments, if the categorized links are non-traversable links, the client 103 updates the link information with the at least one candidate link (i.e., the link identifiers that satisfy the at least one received bloom filter) as the non-traversable link.

Additionally, the client 103 may be configured to determine a total count of decoded links for the map area. According to some embodiments, a total number of candidate links may be the total count of decoded links. In alternate embodiment, the client 103 may initialize a variable with initial value set to zero. The client may add a value (e.g., value=1) to the variable, for each link identifier satisfying the at least one bloom filter. Once all the link identifiers are checked with each bloom filter of the at least one bloom filter, the value of the variable may be the total count of decoded links. The client 103 may determine whether to update or not to update the link information based on the total count of decoded links and the total count of encoded links. For example, the client 103 may determine a ratio of the total count of decoded links and the total count of encoded links to determine whether to update or not to update the link information. For example, if the ratio is above a threshold value (e.g., threshold value=0.5), the client 103 may not update the link information. However, if the ratio is below the threshold value, the client 103 may update the link information.

At 611, the client 103 may provide the candidate links as the categorized links to a navigation application. According to some embodiments, the client 103 may recalculate the route, based on the route encompassing the at least one candidate link. For example, if the candidate link obtained is the blacklisted link, the client 103 generates the route on the map that is traversable for the user. The navigation application may be for example but not limited to a map display or a routing engine.

Accordingly, blocks of the flowcharts 300 to 600 support combinations of means for performing the specified functions and combinations of operations for performing the specified functions for performing the specified functions. It will also be understood that one or more blocks of the flowchart 300, 400, 500, 600 and combinations of blocks in the flowchart 300, 400, 500, and 600 may be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 201a or 201b, the memory 203a or 203b and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for updating link information on a client device, comprising:
   determining, by at least one processor of the client device, at least one map area comprising one or more links, said map area having at least one map area identifier, and the client device being carried by a vehicle;
   sending, from the client device to a data service, a request for at least one link category defined by one or more traversal restrictions, said request identifying the at least one map area, the request being associated with one or more restrictions related to the client device, the one or more links of the map area, or a combination thereof;
   receiving, by the client device from the data service, at least one bloom filter, said at least one bloom filter encoding a link identifier set corresponding to each link of the at least one link category into a bit array using a coding function;
   determining, by the at least one processor, one or more candidate link identifiers for the one or more links in the at least one map area; and
   associating, by at least one processor, at least one candidate link of the one or more candidate link identifiers to the at least one link category, based on a link identifier of the at least one candidate link satisfying the at least one bloom filter based on the coding function, to update the link information on the client device.

2. The method of claim 1, further comprising providing the at least one candidate link to a navigation application, wherein the coding function is a hash function.

3. The method of claim 1, further comprising:
   determining a geographical region encompassing at least a portion of a route;
   determining for the geographical region, the at least one map area covering the at least one portion of the route; and
   including the at least one map area identifier of the at least one map area in the request for at least one link category.

4. The method of claim 3, further comprising recalculating the route, based on the route encompassing the at least one candidate link.

5. The method of claim 1, wherein at least one of the one or more traversal restrictions is vehicle-feature-based including at least one of dimensions of a vehicle, emissions rating of the vehicle, cargo type of the vehicle, cargo capacity of the vehicle, speed of the vehicle, time of travel, engine type of the vehicle, year of manufacture of the vehicle, or a combination thereof.

6. The method of claim 1, further comprising:
   determining expected validity timeframe for the at least one link category; and
   including the expected validity timeframe in the request.

7. The method of claim 1, wherein the determining of one or more candidate link identifiers further comprises:

accessing map version agnostic information regarding each of the one or more links;

generating a map version agnostic identifier for each of the one or more links;

coding the map version agnostic identifier for each of the one or more links using at least one coding function; and providing, the coded map version agnostic identifier for each link of the one or more links, as the one or more candidate link identifiers.

8. The method of claim 1, wherein the at least one of the one or more traversal restrictions is time-based.

9. The method of claim 1, wherein the link identifier set encoded in one of the at least one bloom filter are separate from one another without a connecting node.

10. An apparatus for updating link information on a client device, comprising:

at least one non-transitory memory configured to store computer program code instructions; and at least one processor configured to execute the computer program code instructions to:

determine at least one map area comprising one or more links, said map area having at least one map area identifier, and the client device being carried by a vehicle;

send, to a data service, a request for at least one link category defined by one or more traversal restrictions, said request identifying the at least one map area, the request being associated with one or more restrictions related to the client device, the one or more links of the map area, or a combination thereof;

receive, from the data service, at least one bloom filter, said at least one bloom filter encoding a link identifier set corresponding to each link of the at least one link category into a bit array using a coding function;

determine one or more candidate link identifiers for the one or more links in the at least one map area; and associate, at least one candidate link of the one or more candidate link identifiers to the at least one link category, based on a link identifier of the at least one candidate link satisfying the at least one bloom filter based on the coding function, to update the link information on the client device.

11. The apparatus of claim 10, wherein the at least one processor is further configured to provide the at least one candidate link to a navigation application.

12. The apparatus of claim 10, wherein the at least one map area encompasses at least one portion of a route, and the at least one processor is further configured to:

determine a geographical region encompassing the at least one portion of the route;

determine for the geographical region, the at least one map area covering the at least one portion of the route; and include the at least one map area identifier of the at least one map area in the request for at least one link category.

13. The apparatus of claim 12, wherein the at least one processor is further configured to recalculate the route, based on the route encompassing the at least one candidate link.

14. The apparatus of claim 10, wherein at least one of the one or more traversal restrictions is vehicle-feature-based including at least one of dimensions of a vehicle, emissions rating of the vehicle, cargo type of the vehicle, cargo capacity of the vehicle, speed of the vehicle, time of travel, engine type of the vehicle, year of manufacture of the vehicle, or a combination thereof.

15. The apparatus of claim 10, wherein the at least one processor is further configured to:

determine expected validity timeframe for the at least one link category; and include the expected validity timeframe in the request.

16. The apparatus of claim 10, wherein to determine the one or more candidate link identifiers, the at least one processor is further configured to:

access map version agnostic information regarding each of the one or more links;

generate a map version agnostic identifier for each of the one or more links;

code the map version agnostic identifier for each of the one or more links using at least one coding function; and provide, the coded map version agnostic identifier for each link of the one or more links, as the one or more candidate link identifiers.

17. The apparatus of claim 10, wherein the at least one of the one or more traversal restrictions is time-based.

18. The apparatus of claim 10, wherein the link identifier set encoded in one of the at least one bloom filter are separate from one another without a connecting node.

19. A computer program product comprising a non-transitory computer readable medium having stored thereon computer executable instructions, which when executed by one or more processors, cause the one or more processors to carry out operations for updating link information on a client device, the operations comprising:

determining at least one map area comprising one or more links, said map area having at least one map area identifier, and the client device being carried by a vehicle;

sending, to a data service, a request for at least one link category defined by one or more traversal restrictions, said request identifying the at least one map area, the request being associated with one or more restrictions related to the client device, the one or more links of the map area, or a combination thereof;

receiving, from the data service, at least one bloom filter, said at least one bloom filter encoding a link identifier set corresponding to each link of the at least one link category into a bit array using a coding function;

determining one or more candidate link identifiers for the one or more links in the at least one map area; and associating, at least one candidate link of the one or more candidate link identifiers to the at least one link category, based on a link identifier of the at least one candidate link satisfying the at least one bloom filter based on the coding function, to update the link information on the client device.

20. The computer program product of claim 19, the operations further comprise providing the at least one candidate link to a navigation application.

* * * * *